(12) United States Patent
Harms et al.

(10) Patent No.: US 11,603,181 B2
(45) Date of Patent: Mar. 14, 2023

(54) SUPPORTING WING STRUCTURE FOR AN AIRCRAFT, AND AIRCRAFT HAVING SUCH A SUPPORTING WING STRUCTURE

(71) Applicant: Volocopter GmbH, Bruchsal (DE)

(72) Inventors: Michael Harms, Waldbronn (DE); Ulrich Schaferlein, Karlsdorf-Neuthard (DE); Manuel Kessler, Kirchheim (DE); Sebastian Miesner, Stuttgart (DE)

(73) Assignee: Volocopter GmbH, Bruchsal (DE)

( * ) Notice: Subject to any disclaimer, the term of this patent is extended or adjusted under 35 U.S.C. 154(b) by 295 days.

(21) Appl. No.: 16/879,909

(22) Filed: May 21, 2020

(65) Prior Publication Data

US 2020/0369363 A1     Nov. 26, 2020

(30) Foreign Application Priority Data

May 21, 2019   (DE) .......................... 102019113548.6

(51) Int. Cl.
| | | |
|---|---|---|
| *B64C 3/14* | (2006.01) | |
| *B64C 29/00* | (2006.01) | |
| *B64D 11/00* | (2006.01) | |
| *B64D 27/24* | (2006.01) | |

(52) U.S. Cl.
CPC ............ *B64C 3/14* (2013.01); *B64C 29/0025* (2013.01); *B64D 11/00* (2013.01); *B64D 27/24* (2013.01)

(58) Field of Classification Search
CPC ....... B64C 3/14; B64C 27/08; B64C 29/0025; B64D 11/00; B64D 27/24

USPC ...................................................... 244/17.23
See application file for complete search history.

(56) References Cited

U.S. PATENT DOCUMENTS

| | | |
|---|---|---|
| 9,663,237 B2 | 5/2017 | Senkel et al. |
| 9,896,200 B2 | 2/2018 | Fredericks et al. |
| 2007/0215746 A1 | 9/2007 | Rieken et al. |

(Continued)

FOREIGN PATENT DOCUMENTS

| | | |
|---|---|---|
| DE | 102006019300 | 10/2007 |
| DE | 202012001750 | 5/2012 |
| DE | 102013000168 | 7/2014 |

(Continued)

*Primary Examiner* — Brady W Frazier
(74) *Attorney, Agent, or Firm* — Volpe Koenig

(57) ABSTRACT

A supporting wing structure for an aircraft, in particular for a load-carrying and/or passenger-carrying aircraft, preferably an aircraft in the form of a vertical take-off and landing multicopter having a plurality of electrically driven rotors which are disposed in a distributed manner. The supporting wing structure has a plurality of struts. A first number of the struts are at least largely disposed in a first direction, while a second number of the struts are at least largely disposed in a second direction, the second direction being oriented orthogonal to the first direction. At least the struts of the second number have an aerodynamic profile in cross section, and/or in the struts are connected to one another at least in pairs between neighboring struts by a connecting structure, preferably from individual connecting segments, and the connecting structure or the connecting segments have an aerodynamic profiling. Furthermore an aircraft is provided equipped with such a supporting wing structure.

24 Claims, 5 Drawing Sheets

(56) References Cited

U.S. PATENT DOCUMENTS

2009/0084890 A1 4/2009 Reinhardt
2017/0267367 A1* 9/2017 Senkel .................... B64C 25/56

FOREIGN PATENT DOCUMENTS

| | | |
|---|---|---|
| DE | 102013015908 | 12/2014 |
| EP | 3243747 | 11/2017 |
| WO | 2016035068 | 3/2016 |
| WO | 2018172815 | 9/2018 |

* cited by examiner

SUPPORTING WING STRUCTURE FOR AN AIRCRAFT, AND AIRCRAFT HAVING SUCH A SUPPORTING WING STRUCTURE

INCORPORATION BY REFERENCE

The following documents are incorporated herein by reference as if fully set forth: German Patent Application No. DE 10 2019 113 548.6, filed May 21, 2019.

TECHNICAL FIELD

The invention relates to a supporting wing structure for an aircraft, in particular for a load-carrying and/or passenger-carrying aircraft, preferably an aircraft in the form of a vertical take-off and landing multicopter having a plurality of electrically driven rotors which are disposed in a distributed manner, said supporting wing structure having a plurality of struts, wherein a first number of the struts are at least largely disposed in a first direction, while a second number of the struts are at least largely disposed in a second direction, said second direction being oriented so as to be orthogonal to the first direction.

The invention moreover relates to an aircraft, in particular to a load-carrying and/or passenger-carrying aircraft, preferably in the form of a vertical take-off and landing multicopter having a plurality of electrically driven rotors which are disposed in a distributed manner.

BACKGROUND

The terms "aerial vehicle" and "aircraft" hereunder are used as synonyms. The same applies to the terms "rotor" and "propeller". In the context of the invention, it is irrelevant whether the aircraft is controlled by a (human) pilot or flies autonomously (autopilot).

Aerial vehicles in which the primary structure of the aerial vehicle is designed aerodynamically, such as described in EP 3 243 747 A1, for example, are known in the prior art. The aerial vehicle capable of vertical take-off and landing shown therein changes the entire orientation thereof when transitioning from vertical to horizontal flight. On account thereof, the mentioned primary structure which therein is described as a circular frame having connecting struts is at all times frontally impinged with an incident flow of air. In a hovering flight the air flowing over the structure is accelerated, in particular by the rotor disposed on said structure. In a forward flight, the flight speed of the aerial vehicle is added thereto. However, the direction of incident flow relative to the aerodynamic cladding does not substantially change.

An aerial vehicle in which the alignment of the rotors is variable, or the rotors are pivotably mounted, respectively, is known from U.S. Pat. No. 9,896,200 B2. The direction of the incident flow onto the (primary) structure (or the wings, respectively) thus remains substantially constant, in particular when comparing vertical flight and horizontal flight.

An aerial vehicle which has a substantially round non-rotatable structure which based on a corresponding aerodynamic design configuration is designed to generate lift in a forward flight is furthermore known from US 2007/215746 A1. While the aerodynamic design configuration of the structure offers advantages in a forward flight, this aerodynamic design configuration represents a significant disadvantage due to the change in the direction of the incident flow, in particular in a vertical flight, or in a hovering flight, respectively.

The complexity in terms of closed-loop and open-loop control of aerial vehicles in which either the orientation of the entire aerial vehicle (cf. EP 3 243 747 A1) or else of only parts of said aerial vehicle, for example rotors or wings to which rotors are attached (cf. U.S. Pat. No. 9,896,200 B2) changes during flight is relatively high and correspondingly complicated. Structural parts which mimic a wing profile and generate lift (cf. US 2007/215746 A1) have a high aerodynamic efficiency, that is to say a favorable (desired) circulation flow behavior only across a very minor range of the so-called incident flow angle. These structural parts, by virtue of the large barrier surfaces thereof at large or small angles of attack, rather even represent an aerodynamic disadvantage, in particular in a vertical flight or a hovering flight, respectively.

SUMMARY

The invention is based on the object of achieving a supporting wing structure for an aerial vehicle or an aircraft, by way of which the above-mentioned disadvantages can be avoided so as to favorably influence with simple means the flight behavior of the aerial vehicle, in particular of a vertical take-off and landing aerial vehicle.

This object is achieved by a supporting wing structure for an aircraft, and by an aircraft having one or more features according to the invention.

Advantageous refinements of the concept according to the invention are defined below and in the claims.

According to the invention, a supporting wing structure for an aircraft, in particular for a load-carrying and/or passenger-carrying aircraft, preferably an aircraft in the form of a vertical take-off and landing multicopter copter having a plurality of electrically driven rotors which are disposed in a distributed manner, said supporting wing structure having a plurality of struts, wherein a first number of the struts are at least largely disposed in one direction, while a second number of the struts are at least largely disposed in a second direction, said second direction being oriented so as to be orthogonal to the first direction, is distinguished in that at least the struts of the second number have an aerodynamic profile in cross section, and/or in that the struts between neighboring struts are connected to one another at least in pairs by the connecting structure, preferably from individual connecting segments, wherein the connecting structure or the connecting segments has/have an aerodynamic profiling.

The struts herein can be disposed so as to be substantially in one plane, wherein the first number of the struts are at least largely disposed in the first direction so as to be in or parallel to the plane, wherein a second number of the struts are at least largely disposed in the second direction so as to be in or parallel to the plane. However, the invention is not limited to planar disposals of struts.

The term "aerodynamic profile" presently describes a profile, that is to say a cross-sectional shape, which in a manner normal to the incident flow is imparted an aerodynamic lifting force which is different from zero when said profile experiences an incident flow of air at a defined incident flow angle $\alpha$, in particular in terms of the mentioned plane. Accordingly, a circular profile would not be an aerodynamic profile in the context of this definition. Moreover, "aerodynamic profile" means that a lift-to-drag ratio (ratio of lifting force vs. air resistance) of the profile for a defined incident flow angle $\alpha$, in particular in terms of the plane, is as large as possible, thus larger than angles of attack which deviate from the defined incident flow angle $\alpha$.

By using an "aerodynamic profiling" the following advantages can be achieved in a corresponding design embodiment of the invention: 1) a reduced resistance in the forward flight in comparison to a cylindrical strut profile; 2) an ideally large lift in the forward flight (at the so-called design point of the profile; see below); 3) simultaneously an ideally low obstruction (download) in the hovering flight or the vertical flight, respectively (see below).

In order to transition from a vertical to a horizontal flight state, the entire aircraft in the case of a vertical take-off and landing multicopter having a plurality of preferably electrically driven rotors which are disposed in a distributed manner, said rotors at least in part being disposed in one plane (rotor plane) is induced so as to tilt forward by correspondingly regulating the rotating speeds of different rotors. On account thereof, the incident flow angle $\alpha$ of the incident flow of air onto the supporting wing structure changes in terms of the rotor plane.

The supporting wing structure, or at least some of the struts present therein, or the connecting segments, respectively, according to the invention are now to be provided with an aerodynamic profile, or to have such an aerodynamic profile, respectively, such that the air resistance on account of the supporting wing structure, or the struts or the connecting segments, respectively, is minimized on the one hand. On the other hand, according to the invention, the aerodynamic profile is to generate a lifting force in a forward flight of the aircraft. The term "supporting wing structure" herein explicitly describes a structure which is structurally necessary for transmitting loads (as opposed to a wing which is provided only for generating lift). This supporting wing structure is to be designed in an aerodynamically advantageous manner.

According to the invention, an aircraft, in particular a load-carrying and/or passenger-carrying aircraft, preferably in the form of a vertical take-off and landing multicopter, having a plurality of electrically driven rotors which are disposed in distributed manner, therefore has a supporting wing structure according to the invention for supporting at least the rotors.

In the case of the Volocopter® multicopter which as a known design from the company of the applicant serves as a preferred exemplary embodiment here, struts which form a supporting wing structure and are externally connected to one another by a substantially circular connecting structure from corresponding segments are fastened above a passenger cockpit, or a load, respectively. Motor/rotor assemblies which by rotation of the rotors create lift such that the Volocopter® multicopter is capable of flying are attached to the struts, or to the supporting wing structure, respectively. According to the invention, at least some of the struts, and in the case of a corresponding refinement, alternatively or additionally also the connecting structure (or at least parts thereof) are now configured so as to be aerodynamically effective.

In one refinement of the supporting wing structure according to the invention, it can be provided that the aerodynamic profile is configured for generating a lifting force when an incident flow takes place so as to be substantially transverse to an extent of the struts of the second number. The flight behavior of the aircraft can be decisively improved on account thereof.

In one other refinement of the supporting wing structure according to the invention it can be provided that the first direction is substantially in alignment with a forward flight direction of the aircraft.

A special, aerodynamically optimized profile design of structural elements (struts, connecting structures) of a vertical take-off and landing aerial vehicle is preferably proposed, said special, aerodynamically optimized profile design in a comparatively large range of an incident flow angle having a minor deviation of the optimum design point or lift-to-drag ratio, respectively, of said profile design.

The lift-to-drag ratio correlates with the glide angle $\gamma$. The glide angle $\gamma$ indicates the angle at which an aircraft in the non-propelled state (gliding flight) glides downward in relation to the horizontal. This is a characteristic value of a wing profile of the aircraft. The tangent of said glide angle is the already mentioned lift-to-drag ratio E. The glide ratio is the reciprocal value of the lift-to-drag ratio E. The glide ratio indicates how many meters an aircraft glides in calm air in the horizontal direction while losing one meter of altitude. The terms lift-to-drag ratio and drag ratio are often confused in colloquial use.

In a corresponding refinement of the supporting wing structure according to the invention, it can accordingly be provided that the aerodynamic profile has a lift-to-drag ratio which in an incident flow onto the struts of the second number at an angle (of attack) a in an angular range of approximately $-15°<\alpha<+15°$, preferably $-10°<\alpha<+10°$, most preferably $-5°<\alpha<+5°$, is substantially constant (or has a positive effect, respectively), in particular in terms of an extent of the mentioned plane, wherein $\alpha=0°$ describes an incident flow parallel to an optimum angle of attack of the supporting wing structure according to the invention. In this context, "substantially constant" means that the lift-to-drag ratio across the mentioned angular range decreases only by approximately $-50\%$, preferably only by approximately $25\%$, particularly preferably even only by approximately $10\%$.

The design of the supporting wing structure, or of the struts, is accordingly aerodynamically optimized such that said design in a wide range of the incident flow angle $\alpha$, preferably in a range of $+/-15°$, even more preferably in a range of $+/-10°$, especially preferably in a range of $+/-5°$, in terms of an optimum design point O which may coincide with an incident flow parallel to the optimum angle of attack, has lift-to-drag ratios which do not deviate (or decrease, respectively) from the optimum lift-to-drag ratio in the design point O by more than $50\%$, preferably only by approximately $25\%$, particularly preferably $10\%$.

The "design point O" generally describes the operating point or operating state for which the supporting wing structure, or the aerodynamic profile, respectively, is specified, or particularly suitable (designed), respectively, here in particular while taking into account a nominal direction of incident flow while taking into account the orientation/inclination of the aircraft in a forward flight and the superimposed downdraft of the rotors.

Profiles having a lift-to-drag trend L/D in terms of the incident flow angle $\alpha$ which in absolute terms indeed have high lift-to-drag ratios but only across a relatively small range of the incident flow angle $\alpha$ are known from the prior art. The lift-to-drag ratio disadvantageously drops steeply outside this range, that is to say that the effect of lift disappears.

As opposed thereto, a profile advantageously used in the context of the present invention has a characteristic which is distinguished by a relatively flat trend of the lift-to-drag ratio across a comparatively large range of the incident flow angle $\alpha$, as has been stated above, so as to be able to utilize the effect of lift in an improved manner across a larger range of the incident flow angle.

Due to a profile design of this type it is in particular possible to find a compromise for an aerodynamic design concept across a wide range of the angle of attack, the latter being necessary for the described aircraft by varying the angle of attack as a function of the position in flight.

In another refinement of the supporting wing structure according to the invention it can be provided that the aerodynamic profile has a relative profile thickness d/l of more than or equal to 0.2, preferably more than or equal to 0.3, most preferably equal to 0.45, where d describes a profile thickness, preferably substantially perpendicular to the mentioned plane, and l describes a profile length, preferably in or parallel to the mentioned plane.

Especially in the case of vertical take-off and landing aircraft such as the Volocopter® multicopter from the company of the applicant, there is the additional requirement to achieve an ideally minor stretch of the profile for the hovering flight, so as to minimize a parasitic surface which due to the downdraft of the rotors generates a download in the hovering flight. Therefore, the above-mentioned preferred refinement of the supporting wing structure according to the invention is distinguished by a relatively large profile thickness d of more than 20%, preferably more than 25%, most preferably more than 30%, in terms of a profile length l and is thus clearly demarcated with respect to usual aerodynamic profiles which are configured so as to be significantly longer.

In yet another refinement of the supporting wing structure according to the invention it can be provided that the aerodynamic profile on the lower side, in particular in terms of the mentioned plane, has an approximately S-shaped external contour.

Such an external contour in the region of one of the halves of the "S" defines a cavity or a (concave) recess which can cause a controlled separation of the flow. This improves the aerodynamic properties of the profile in terms of a fictitious enlargement of the displacement thickness of the profile and thus of the impulse thickness being created on account of the separation. On account thereof, the profile in the forward flight is fictitiously lengthened, on account of which more lift can be generated. However, said fictitious region is not present in a hovering flight or a vertical climb or descend, respectively, on account of which the barred surface is smaller.

In another advantageous refinement of the supporting wing structure according to the invention it can correspondingly be provided that the aerodynamic profile on the lower side, in particular in terms of the mentioned plane, preferably on the rear side thereof that faces away from the forward flight direction, on the external contour thereof has a concave region. This further improves the aerodynamic properties in the desired manner.

In an additional refinement of the supporting wing structure according to the invention, it can be provided that the aerodynamic profile is configured so as to be asymmetrical, in particular in terms of the mentioned plane. In particular, the profile on the upper side thereof can be configured so as to be relatively flat and only slightly curved, while said profile on the lower side thereof has a significantly more pronounced curvature, optionally paired with the above-mentioned S-shaped and/or partially concave trend. This ensures an additional improvement of the aerodynamic properties of the profile in the desired manner.

In one refinement of the supporting wing structure according to the invention it can also be provided that the aerodynamic profile is especially configured in such a manner as is shown in the appended FIG. 5 or 5A. Research carried out by the applicant demonstrated that such a profile unifies the above-mentioned properties in a particularly advantageous manner.

In one extremely preferred refinement of the supporting wing structure according to the invention it can be provided that the aerodynamic profile is configured in the form of an external cladding of the struts of the second number, or that a main body of the struts of the second number on the external surface thereof is shaped according to the aerodynamic profile. It is thus not necessary for the struts of the supporting wing structure per se to be designed or redesigned so as to be aerodynamically effective. Rather, proven existing strut shapes can be used and just clouded in an aerodynamically effective manner. This thus moreover results in an improved flexibility in the production.

In one refinement of the supporting wing structure according to the invention it can moreover be provided that the struts of the first number have a symmetrical profile, preferably a round, in particular oval or elliptic profile, most preferably in terms of the mentioned plane and/or perpendicularly to the latter. In the context of this specification, such a profile is considered aerodynamically ineffective or neutral so as to achieve an ideally low air resistance.

In one refinement of the supporting wing structure according to the invention it can furthermore be provided that the (neutral) profile is configured in the form of an external cladding of the struts of the first number, or that a main body of the struts of the first number on the external surface thereof is shaped according to the (neutral) profile. Rather, proven existing struts shapes can be used and just be cladded in an aerodynamically effective manner. This likewise thus results in improved flexibility in the production.

In one refinement of the supporting wing structure according to the invention it can be provided that those struts which in a first angular range are oriented about the first direction (preferably the forward flight direction), preferably a first angular range which is symmetrical in terms of the first direction, most preferably a first angular range from approximately $-45°$ ($+315°$) to approximately $+45°$ in terms of the first direction, are configured as struts of the first number. In this range, aerodynamically neutral struts having an ideally low air resistance are thus preferably used.

In one refinement of the supporting wing structure according to the invention, it can be provided that those struts which are oriented in a second angular range in terms of the first direction (preferably the forward flight direction), preferably a second angular range which is symmetrical in terms of the second direction, most preferably a second angular range from approximately $+45°$ to approximately $+135°$ and approximately $+225°$ to approximately $+315°$ in terms of the first direction, are configured as struts of the second number. Struts which are configured so as to be aerodynamically effective are thus preferably used in this range.

In one refinement of the supporting wing structure according to the invention it can be provided that those struts which are oriented in a third angular range in terms of the first direction (preferably the forward flight direction), preferably in a third angular range which is symmetrical in terms of the direction, most preferably in a third angular range from approximately $+135°$ to approximately $+225°$ in terms of the first direction, are configured as struts of the first number. Struts which are likewise aerodynamically neutral having an ideally low air resistance are thus preferably used in this range.

In one refinement of the supporting wing structure according to the invention, it can be provided that the remaining struts, thus those struts which are oriented in an angular range of approximately +45° to approximately +135°, and or from approximately +225° to approximately +315° in terms of the first direction, are configured as struts of the second number. The use of struts which are configured as aerodynamically effective has proven particularly effective in this range by virtue of the flow conditions. This corresponds to the second angular range already defined earlier.

In one refinement of the supporting wing structure according to the invention, it can be provided that the struts of the first number in the first or the third angular range have in each case an identical aerodynamic profile having a preferably minimized air resistance. This has proven advantageous not least for reasons of symmetry.

In one refinement of the supporting wing structure according to the invention, it can be provided that the struts of the first number in the first or the third angular range have an aerodynamic profile which differs from one strut to the other strut. In this way, the dissimilar orientation of individual struts in terms of the first direction can be taken into account so as to increase the achievable effect.

In one refinement of the supporting wing structure according to the invention, it can be provided that the struts emanate from a central fastening structure and by way of the respective first end of said struts are fastened to the central fastening structure. The fastening can be configured so as to be releasable in order to disassemble the aircraft for transportation.

In one refinement of the supporting wing structure according to the invention, it can be provided that the struts at the respective second free ends thereof, as has already been mentioned, between neighboring struts are connected to one another at least in pairs by a connecting structure. The structure is stabilized on account thereof. The struts preferably are of identical length such that an annular connecting structure which can be assembled from segments which are bent in the manner of a divided circle results.

It can be provided according to the invention that the connecting structure, in particular the segments (bent in the manner of a divided circle), alternatively or additionally to the struts, per se has/have an aerodynamic profiling, preferably as has been described above. Said aerodynamic profile may be restricted to specific angular ranges in terms of the first direction (forward flight direction), as has likewise been described above. Additional lift effects can be achieved on account thereof.

In one refinement of the supporting wing structure according to the invention it can be provided that the struts, preferably emanating from a central fastening structure, are configured so as to branch out in an arborescent manner in the outward direction. Such a design embodiment has proven advantageous because this allows in particular a double hexagonal rotor arrangement.

In a corresponding refinement of the supporting wing structure according to the instruction, it can be provided that the struts are configured and provided for supporting drive units of the aircraft, said drive units preferably having in each case at least one rotor and one motor unit for driving the rotor.

In another refinement of the supporting wing structure according to the invention it can be provided that a plurality of the rotors disposed on the supporting wing structure and a plurality of the motors for driving the rotors disposed on the supporting wing structure are present. Such a redundant design embodiment increases the operational reliability In yet another refinement of the aircraft according to the invention, it can be provided that at least some of the rotors are disposed above the mentioned plane. Such an arrangement has proven particularly advantageous in terms of aviation and safety technology.

In one refinement of the aircraft according to the invention it can also be provided that a passenger cockpit and/or a load receptacle are/is disposed below the mentioned plane. In this way, the aircraft is equipped for transporting passengers and/or modes even in adverse weather conditions.

A particularly advantageous design of the embodiments which in part has already been mentioned above is to be referred to hereunder and in the context of the above:

In the design of the Volocopter® multicopter which is known per se, struts which are connected to one another by a substantially circular supporting wing structure are fastened above a passenger cockpit, or a load, respectively. Motor/rotor assemblies which by rotation of the rotors create lift such that the Volocopter® is capable of flying are attached to the struts, or to the supporting wing structure, respectively.

An aerodynamically optimized profile design of said struts and/or of connecting structures disposed therebetween is preferably proposed, said aerodynamically optimized profile design in a comparatively large range of an incident flow angle having a minor deviation of the optimum design point/the lift-to-drag ratio thereof and herein being configured for generating lift.

By virtue of the urban field of application of the Volocopter®, flight speeds in a speed range <300 km/h were researched in this context, wherein the aerodynamic profile was optimized to a flight speed v between 100 km/h>v>60 km/h, in particular 85 km/h>v>75 km/h.

The aerodynamic profile of the supporting wing structure, or of the struts and/or of the connecting segments, respectively, herein varies across the circumference of the (rotor) plane, depending on the position in terms of a forward flight, wherein in particular the front (−45°<ß<45°) as well as the rear range (135°<ß<225°) may have similar profiles, and deviating therefrom the respective lateral ranges to the right (45°<ß<135°) and to the left (225°<ß<315°) of the cockpit may again have mutually similar profiles.

The design of the supporting wing structure, or of the struts, respectively, herein is preferably aerodynamically optimized such that said design in a wide range of the incident flow angle α, preferably in a range of +/−15°, preferably +/−10°, most preferably +/−5°, in terms of an optimum design point has lift-to-drag ratios which do not deviate from the optimum lift-to-drag ratio in the design point by more than 10%.

On account of a profile design of this type it is in particular possible to find a compromise for an aerodynamic design concept across a wide range of the incident flow angle, the latter becoming necessary for the described aircraft by varying the incident flow angle as a function of the position in flight.

This explicitly includes design embodiments in which adapting the angle of attack between the struts and also within a strut, for example by way of twist, takes place individually across the running length (longitudinal extent) of the respective strut. In the case of specific aircraft, the influences of rotor downdraft are relatively intense, depending on the position, which is why it may be advantageous for the optimum angle of attack of the aerodynamic profile to vary (for example twist) across the length of a strut.

Moreover, with a view to a hovering flight, an ideally minor stretch of the profile may be advantageous for minimizing the parasitic surface which in the hovering flight generates download on account of the downdraft of the rotors. Therefore, the proposed aerodynamic profiling or cladding is characterized by a relatively minor stretch, or of a high-profile thickness (ratio between profile thickness and profile length), respectively, of more than 20% (or even more than 30%) and is thus clearly demarcated from usual aerodynamic profiles which have a significantly longer stretch.

BRIEF DESCRIPTION OF THE DRAWINGS

Further properties and advantages of the invention are derived from the description hereunder of exemplary embodiments with reference to the drawings in which.

DETAILED DESCRIPTION

Figure 1:
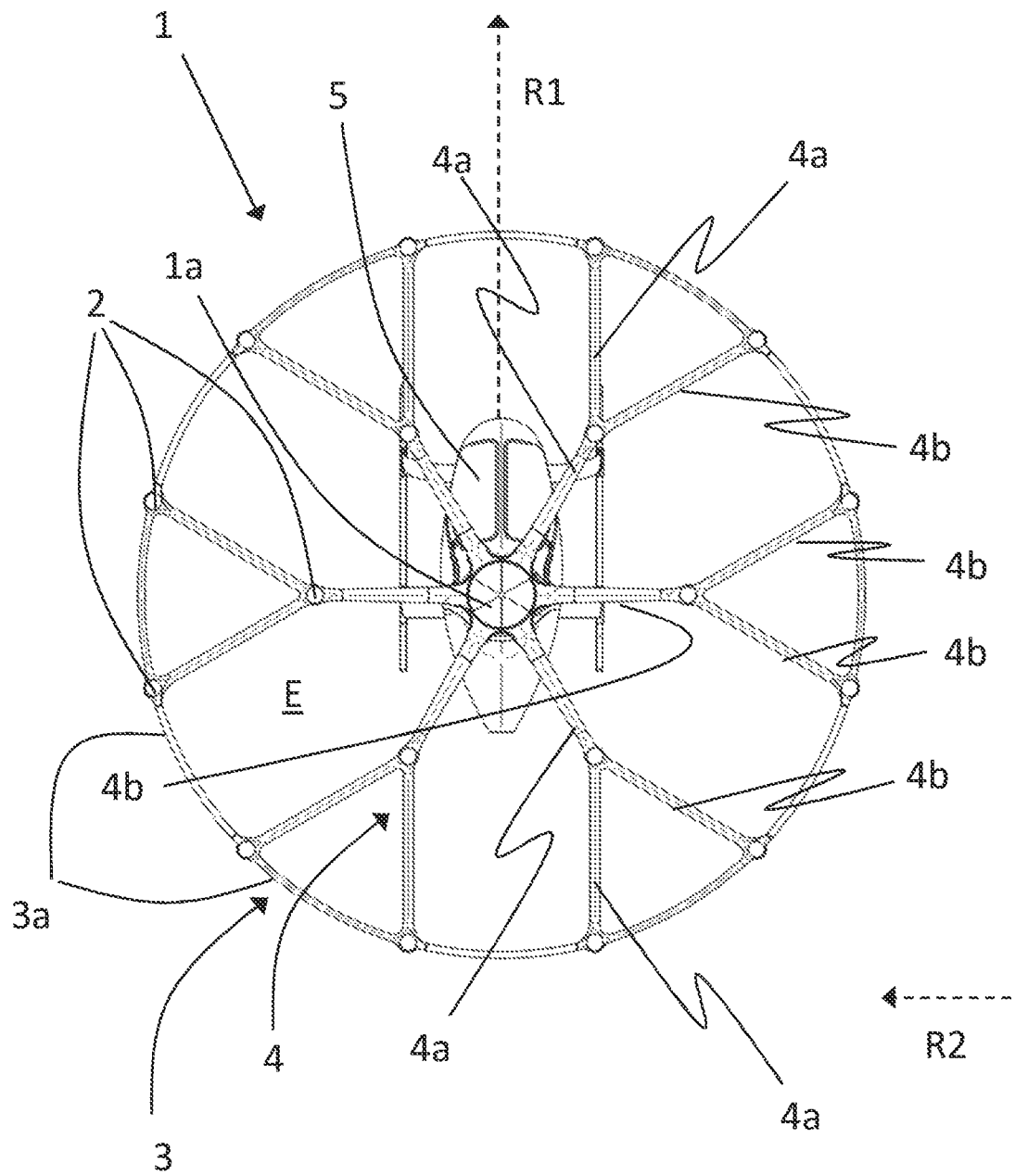
FIG. 1 shows an aircraft without rotors in a view from above, looking toward the supporting wing structure.

FIG. 1 shows a load-carrying and/or passenger-carrying aircraft 1 in the form of a vertical take-off and landing multicopter produced by the applicant, having a plurality of electrically driven rotors which are disposed in a distributed manner and which are not illustrated for reasons of clarity in FIG. 1. Reference sign 2 identifies the associated motor units or (electric) motors, wherein one rotor is preferably assigned to each motor 2. The aircraft 1 possesses a supporting wing structure 3 for the motor/rotors, said supporting wing structure 3 having a plurality of struts 4 which are disposed substantially in a plane E (parallel to the rotor plane) and, emanating from a central fastening structure 1a, branch out in an arborescent (Y-shaped) manner toward the outside. FIG. 1 shows a view from above, looking onto said plane E. On the external periphery of the supporting wing structure 3, neighboring struts 4 in the region of the free ends thereof are connected in pairs by way of connecting structures in the form of segments 3a which are bent in the manner of divided circles. A passenger cockpit 5 is disposed below the plane E. A first number of the struts 4 are at least largely disposed in a first direction R1 in or parallel to the plane E, said first direction R1 coinciding with a forward flight direction of the aircraft 1 (cf. the x-coordinate shown in FIG. 1). Said struts in FIG. 1 are identified with the reference sign 4a. In contrast, a second number of the struts 4 are at least largely disposed in a second direction R2 in or parallel to the plane E, said second direction R2 being oriented so as to be orthogonal to the first direction R1 (y-coordinate). Said struts in FIG. 1 are identified by the reference sign 4b. At least the struts 4b of the second number have an aerodynamic profile in cross section, this being discussed in yet more detail hereunder. The disposal of the struts 4 is symmetrical in terms of the x-axis, which is why the struts 4 are identified only in one half of the illustration.

Figure 2:
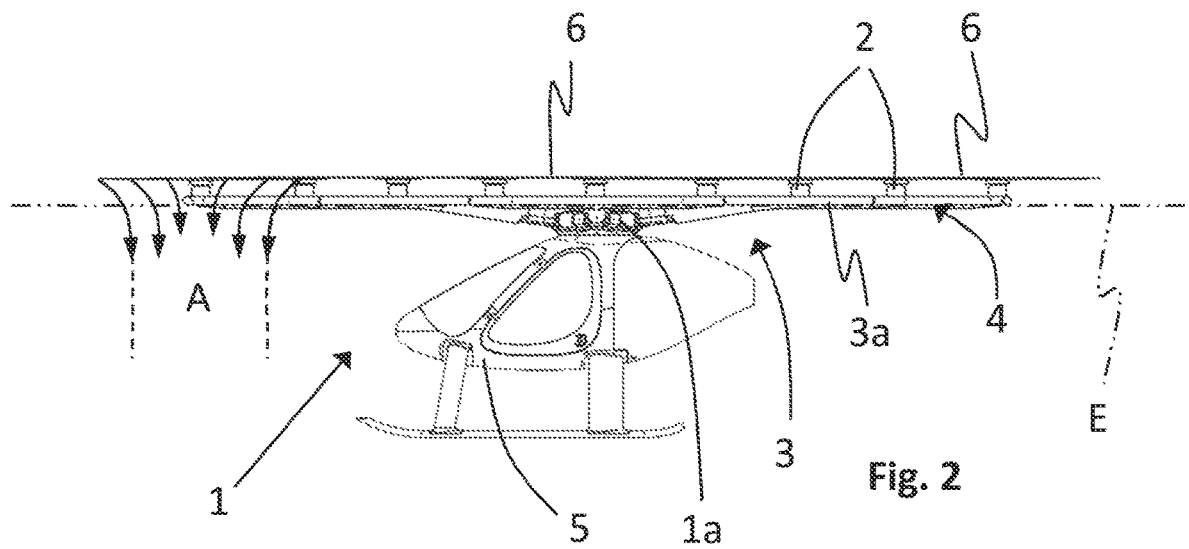
FIG. 2 shows the aircraft from FIG. 1 with rotors, in a lateral view.

FIG. 2 shows the aircraft 1 from FIG. 1 including rotors 6 of which only a few are identified for reasons of clarity, said aircraft 1 being in a hovering flight. The rotors 6 in the hovering flight generate the downdraft illustrated by arrows at the reference sign A, and on account thereof download, when the downdraft A interacts with structural parts of the aircraft 1, for example with the supporting wing structure 3, or the struts 4 and the segments 3a, respectively.

Figure 3:
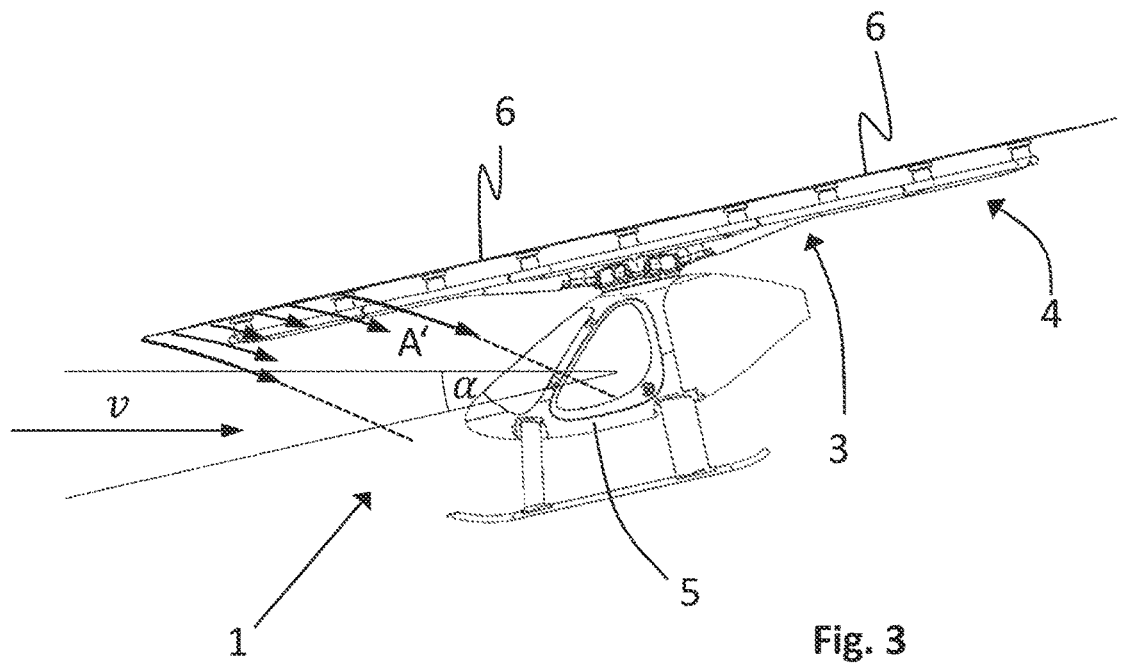
FIG. 3 shows the aircraft from FIG. 2 in the forward flight.

FIG. 3 shows the aircraft 1 from FIG. 2 in the forward flight. In order to change from the vertical (hovering) flight shown in FIG. 2 to a horizontal flight state according to FIG. 3, the entire aircraft 1 in the case of the vertical take-off and landing multicopter shown is incited to tilt forward by correspondingly regulating the rotating speeds of different rotors 6. On account thereof, the incident flow angle $\alpha$ of the incident flow of air onto the supporting wing structure 3 in terms of the (rotor) plane E changes, as is illustrated. The reference sign v identifies the flight speed of the aircraft 1, or the speed of the incident flow of air. The arrows at the reference sign A' symbolize the resulting air flow in the region of the rotors 6 (which are at the front in the flight direction). By virtue of the conjoint effect of the forward tilt of the aircraft 1 and of the downward airflow caused by the rotors 6 an effective incident flow angle $\alpha+x$ consequently results in the region of the supporting wing structure 3, or of the struts 4, respectively.

According to the invention, the supporting wing structure 3, or at least some of the struts 4, 4a, 4b present therein, respectively, is/are now to be provided with an aerodynamic profile, or to have such an aerodynamic profile, respectively, such that the air resistance on account of the supporting wing structure 3, or the struts 4, 4a, 4b, respectively, is minimized, on the one hand. On the other hand, the aerodynamic profile in a forward flight of the aircraft 1 is according to the invention to generate a lifting force so as to support the movement in flight.

This preferably relates to the struts 4b of the second number (cf. FIG. 1), while the struts 4a of the first number which are oriented approximately in the forward flight direction R1 can have an aerodynamically neutral profile, for example an elliptic profile, so as to generate as little aerodynamic resistance as possible.

By virtue of the above-mentioned symmetry of the aircraft 1, struts 4 in specific ranges of an angle ß defined in the plane E furthermore preferably possess profiles which are identical about a vertical axis of the aircraft 1, wherein the value ß=0° corresponds to the forward flight direction R1.

In particular, the struts 4 in the front range (−45°<ß<45°) as well as in the rear range (135°<ß<225°) preferably have similar or identical profiles, while the struts 4, deviating therefrom, in the respective lateral ranges to the right (45°<ß<135°) and to the left (225°<ß<315°) of the cockpit 5 may have other profiles which again however are mutually similar.

Figure 4:
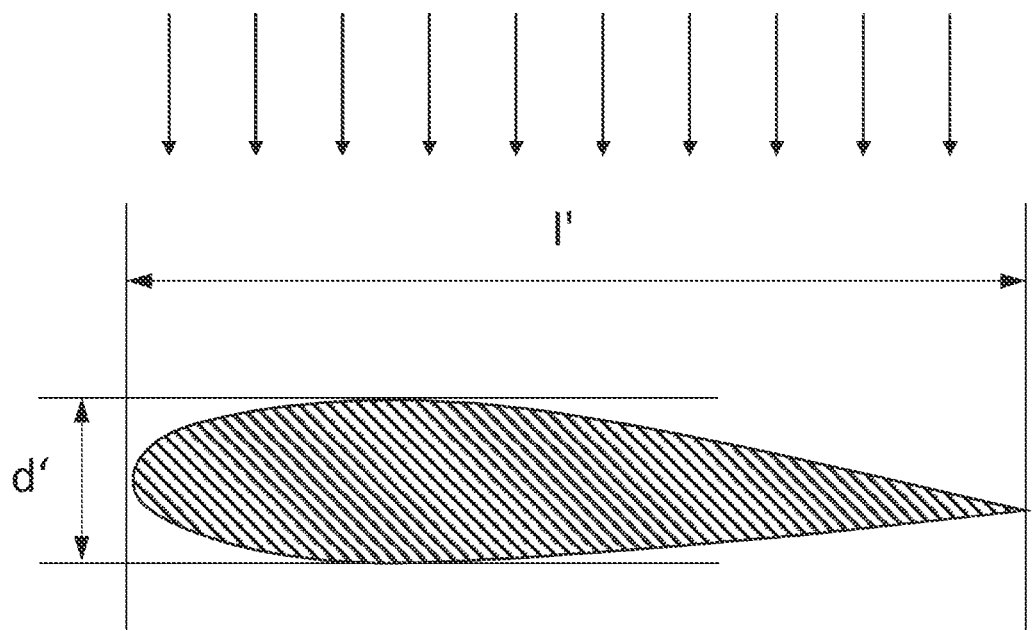
FIG. 4 shows a previously known aerodynamic profile having a relatively large stretch.
Figure 5:
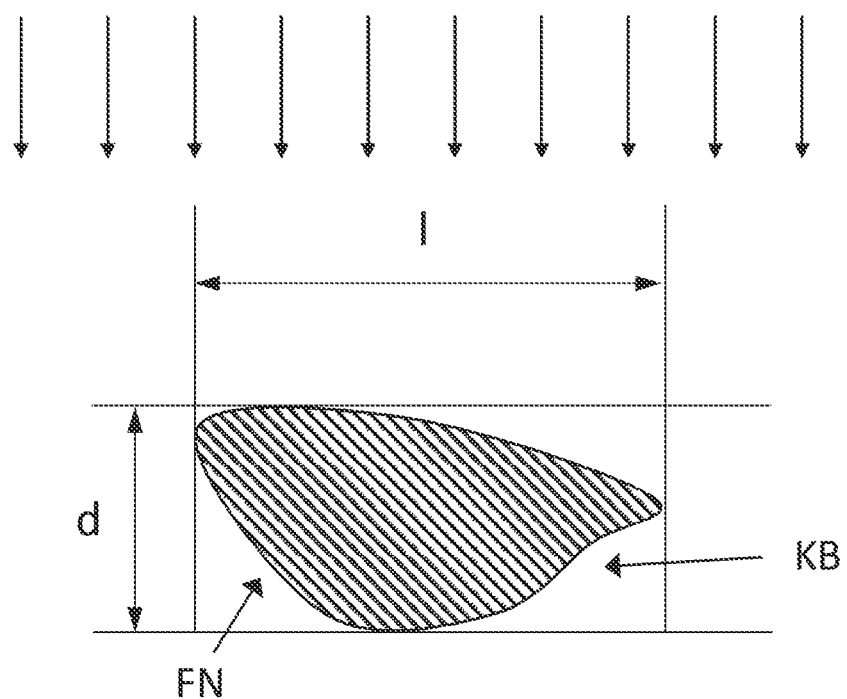
FIG. 5 shows an aerodynamic profile having a relatively large profile height.
Figure 5A:
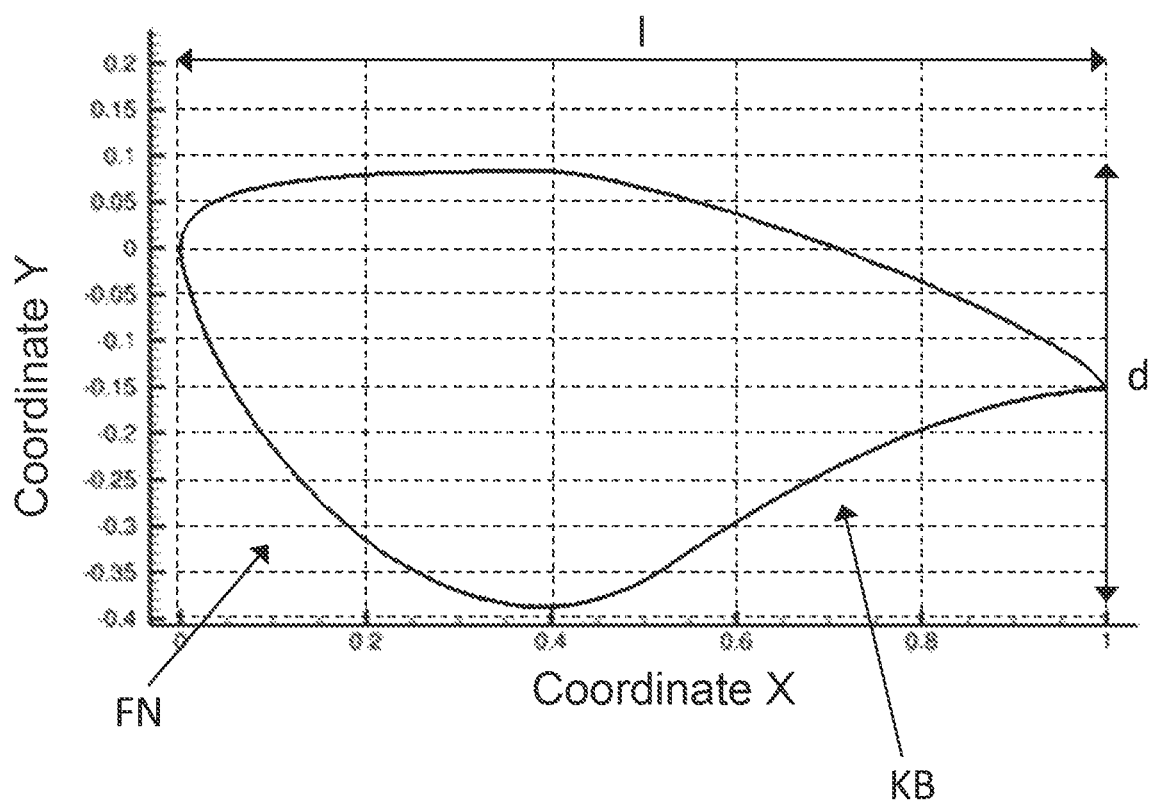
FIG. 5A shows the profile in FIG. 5a in a more precise illustration.

While FIG. 4 shows a conventional aerodynamic profile which has a relatively large stretch l'/d', an aerodynamic profile which is preferably used in the context of the invention is illustrated in FIG. 5 (cf. also FIG. 5A). Said aerodynamic profile preferably used is distinguished by the following features which may be developed collectively or individually as well as to a greater or lesser extent: an approximately S-shaped trend on the lower side (so-called S-feature) having a partially convex and partially concave trend; flat nose FN having a large curvature radius (in the left lower region); a relatively large profile thickness: d/l>0.2, preferably >0.3. Especially the "cavity" (concave region KB) in the rear lower region by virtue of a controlled separation of the flow has a favorable effect on the desired aerodynamic behavior.

When comparing the profiles according to FIG. 4 and FIG. 5 or 5A, respectively, it furthermore becomes obvious that the profile according to Figure s5, 5a is also shorter in absolute terms (1<1'). In particular in a vertical take-off and landing aircraft such as the Volocopter® multicopter from the company of the applicant, there is specifically the already mentioned necessity of achieving an ideally minor stretch of the profile for the hovering flight or the vertical flight, respectively, (cf. FIG. 2), so as to minimize the parasitic surface which is exposed to the downdraft A.

The profile according to FIG. 5 is illustrated even more precisely and with corresponding coordinate indications in FIG. 5a. The already mentioned optimum design point O (nominal incident flow parallel to the x-axis (abscissa)) lies in the origin of the coordinate system shown.

Figure 6:
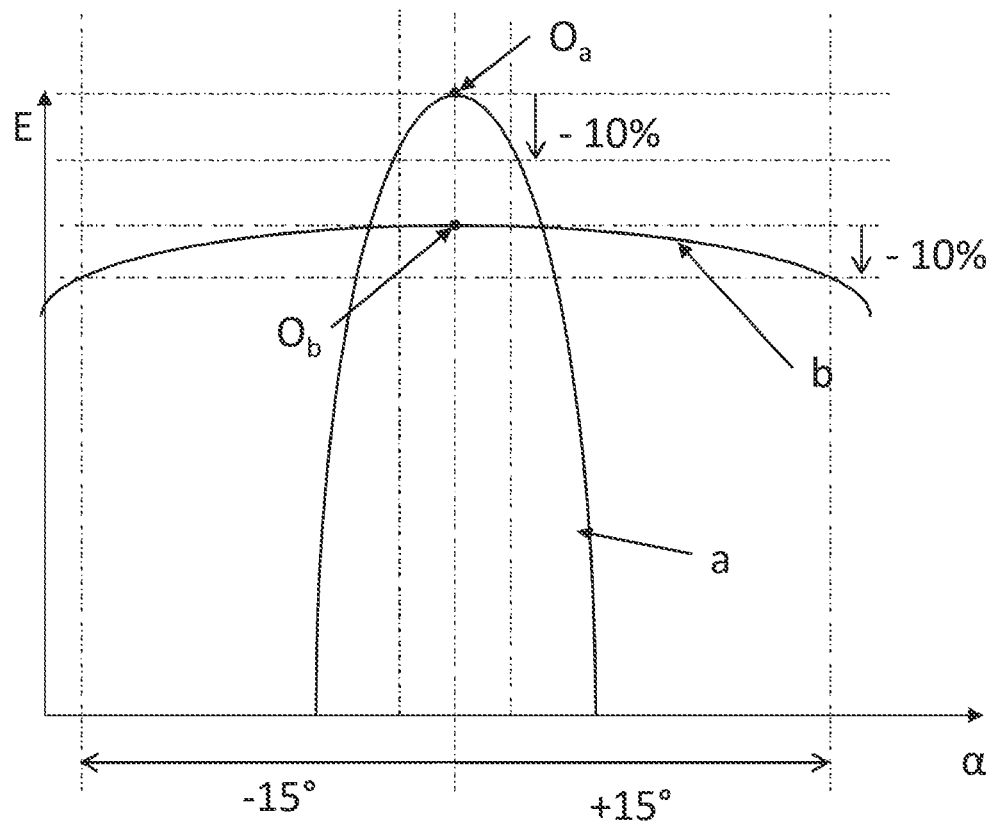
FIG. 6 shows a graphic illustration of the correlation between the lift-to-drag ratio and the incident flow angle.

FIG. 6 schematically shows a change in the lift-to-drag ratio (ratio of the lift L to air resistance D:E=L/D) by way of the incident flow angle $\alpha$ for the profile according to Figure s5, 5a at the reference sign b. The curve at the reference sign a for comparison shows a trend of the lift-to-drag ratio E (L/D) known from the prior art in terms of the incident flow angle $\alpha$. It can be seen herein that the previously known profile by way of a lift-to-drag ratio trend according to curve a may indeed have high (higher) lift-to-drag ratio in absolute terms, but only across a relatively small range of the incident flow angle $\alpha$.

As opposed thereto, in the case of b the corresponding trend for the profile according to FIGS. 5, 5A is shown for the profile proposed here. A relatively flat profile of the lift-to-drag ratio across a comparatively large range of the incident flow angle $\alpha$ results here, that is to say that the profile has a substantially constant lift-to-drag ratio across wide ranges of a, which is appropriate for the circumstances shown in FIG. 3 and ensures practically constant aerodynamic conditions even at variable angles of inclination, or variable relative angles between the airflow and the supporting wing structure, respectively. $O_a$ and $O_b$ identify the respective optimum design points.

Figure 7:
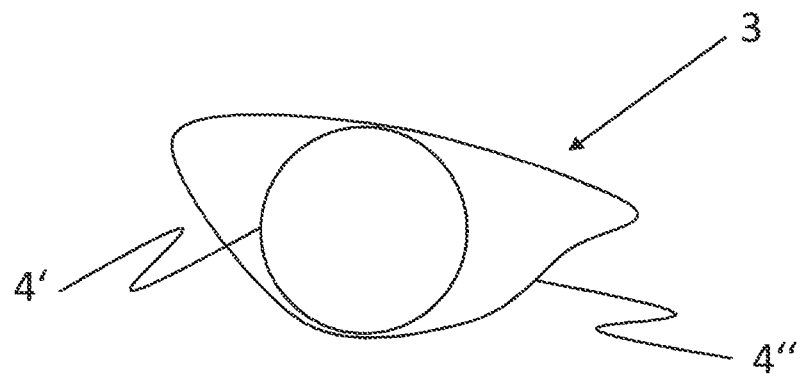
FIG. 7 shows a potential design embodiment of a strut cladding according to the invention.

Proceeding from the profile in FIG. 5 or FIG. 5A, FIG. 7 shows a potential design embodiment of the supporting wing structure 3 and of the struts 4 or 4b, respectively, in cross section. The actual strut or supporting structure 4' (especially for these struts 4b) according to this design embodiment has a circular cross-section and is disposed in the interior. Said strut or supporting structure 4' is externally surrounded by a cladding 4", said cladding 4" having the shape of the profile according to FIG. 5, 5A. In this way, conventional components can be used and be subsequently aerodynamically improved. Alternatively, a main body, especially of the struts 4b of the second number, can be shaped according to the aerodynamic profile directly on the external surface of said main body.

The connecting structures in the form of the segments 3a bent in the manner of a divided circle (cf. FIG. 1) can also have an aerodynamic profiling, as mentioned, preferably in the portions which in the forward flight direction are disposed in the front range, for example for $-45°<\beta<45°$, or else in the rear range ($135°<\beta<225°$). Regions of the segments 3a bent in the manner of a divided circle that have an elliptic cross section can be disposed therebetween. The transitions between the profile shapes can be configured so as to be continuous (flowing). The same applies to the struts 4 (4a, 4b). Various branches of struts 4 which branch out in an arborescent manner may have dissimilar profiles. The profiles can be more or less pronounced, depending on the angular position ß.

In principle, only a few different angles relative to the first direction R1 exist for the struts 4 in the aircraft according to FIG. 1, specifically 0° (or 180°, respectively) 60° and 120° for the external struts 4, as well as 30°, 90° and 150° for the internal struts. Correspondingly, there are preferably only a few dissimilar profiling shapes which can depend in particular on the mentioned angle and/or on the location of attachment in the aircraft (front, rear, side).

The invention claimed is:

1. A supporting wing structure (3) for an aircraft (1), said supporting wing structure comprising:
    a plurality of struts (4, 4a, 4b), a first number of the struts (4a) are primarily disposed in a first direction (R1), wherein the first direction (R1) is substantially in alignment with a forward flight direction of the aircraft (1), and a second number of the struts (4b) are primarily disposed in a second direction (R2), said second direction (R2) being oriented so as to be orthogonal to the first direction (R1),
    at least the struts (4b) of the second number have an aerodynamic profile in cross section,
    the struts (4, 4a, 4b) are connected to one another, pairwise between adjacent ones of the struts (4, 4a, 4b), by a connecting structure, and the connecting structure has a further aerodynamic profiling; and
    the aerodynamic profile and the further aerodynamic profiling being configured to generate a lifting force during forward flight.

2. The supporting wing structure (3) as claimed in claim 1, wherein at least the struts (4b) of the second number are disposed substantially in a common plane (E).

3. The supporting wing structure (3) as claimed in claim 2, wherein the aerodynamic profile has a lift-to-drag ratio which, in an incident flow onto the struts (4b) of the second number at an angle $\alpha$ in an angular range of $-15°<\alpha<+15°$, in terms of an extent of the plane (E), is substantially constant.

4. The supporting wing structure (3) as claimed in claim 1, wherein the aerodynamic profile has a relative profile thickness d/l of more than or equal to 0.2, where d is a profile thickness and l is a profile length.

5. The supporting wing structure (3) as claimed in claim 2, wherein the aerodynamic profile on a lower side of the plane (E) has an approximately S-shaped external contour.

6. The supporting wing structure (3) as claimed in claim 2, wherein the aerodynamic profile on a lower side of the plane (E) on a rear side thereof that faces away from a forward flight direction has an external contour with a concave region (KB).

7. The supporting wing structure (3) as claimed in claim 2, wherein the aerodynamic profile is configured asymmetrical with respect to the plane (E), and is configured with at least one of: an approximately S-shaped trend on the lower side thereof, a partially convex and partially concave trend on the lower side thereof, a relative flat nose (FN) with a relatively large curvature radius, a relatively large profile thickness, d/l>0.2, or a concave region (KB) in a rear lower portion.

8. The supporting wing structure (3) as claimed in claim 1, wherein the aerodynamic profile is configured in an external cladding (4") of the struts (4b) of the second number, or a main body of the struts (4b) of the second number are shaped on an external profile thereof with the aerodynamic profile.

9. The supporting wing structure (3) as claimed in claim 2, wherein the struts (4a) of the first number have a symmetrical profile with respect to the plane (E).

10. The supporting wing structure (3) as claimed in claim 9, wherein the symmetrical profile is configured in an external cladding (4") of the struts (4', 4a) of the first number, or a main body of the struts (4a) of the first number are shaped on an external profile thereof with the symmetrical profile.

11. The supporting wing structure (3) as claimed in claim 1, wherein the struts (4a) which are oriented in a first angular range from approximately −45° to approximately +45° about the first direction (R1) are configured as struts (4a) of the first number.

12. The supporting wing structure (3) as claimed in claim 11, wherein the struts (4b) which are oriented in a second angular range of approximately +45° to approximately +135° and approximately +225° to approximately +315° to the first direction (R1) are configured as struts (4b) of the second number.

13. The supporting wing structure (3) as claimed in claim 12, wherein the struts (4a) which are oriented in a third angular range of approximately +135° to approximately +225° to the first direction (R1) are configured as struts (4a) of the first number.

14. The supporting wing structure (3) as claimed in claim 13, wherein the struts (4a) of the first number in the first or the third angular range have in each case an identical aerodynamic profile.

15. The supporting wing structure (3) as claimed in claim 1, wherein the struts (4, 4a, 4b) emanate from a central fastening structure (1a) and are fastened by respective first ends of said struts (4, 4a, 4b) to the central fastening structure (1a).

16. The supporting wing structure (3) as claimed in claim 1, wherein the struts (4, 4a, 4b), at respective second free ends thereof, between neighboring ones of the struts (4, 4a, 4b) are connected to one another in pairs by the connecting structure.

17. The supporting wing structure (3) as claimed in claim 1, wherein the struts (4, 4a, 4b) are configured to branch out in an arborescent manner.

18. The supporting wing structure (3) as claimed in claim 1, wherein the struts (4, 4a, 4b) are configured to support drive units (2, 6) of the aircraft, said drive units (2, 6) having in each case at least one rotor (6) and one motor unit (2) for driving the rotor (6).

19. An aircraft (1), comprising a plurality of electrically driven rotors (6) which are disposed in a distributed manner and the supporting wing structure (3) as claimed in claim 1 that supports at least the rotors (6).

20. The aircraft (1) as claimed in claim 19, further comprising a plurality of motors (2) configured to drive the rotors (6) disposed on the supporting wing structure (3).

21. The aircraft (1) as claimed in claim 20, wherein at least some of the rotors (6) are disposed above a common plane (E) in which at least the struts (4b) of the second number are disposed.

22. The aircraft (1) as claimed in claim 21, further comprising at least one of a passenger cockpit (5) or a load receptacle disposed below the common plane (E).

23. The aircraft (1) as claimed in claim 21, wherein the aircraft is a vertical take-off and landing multicopter.

24. The supporting wing structure (3) as claimed in claim 1, wherein the connecting structure comprises connecting segments (3a) which have the aerodynamic profiling.

* * * * *